US008706913B2

(12) United States Patent
Doherty

(10) Patent No.: US 8,706,913 B2
(45) Date of Patent: Apr. 22, 2014

(54) RESIDENTIAL GATEWAY SYSTEM FOR AUTOMATED CONTROL OF RESIDENTIAL DEVICES

(75) Inventor: James M. Doherty, Georgetown, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1783 days.

(21) Appl. No.: 10/029,928

(22) Filed: Dec. 31, 2001

(65) Prior Publication Data
US 2003/0126295 A1 Jul. 3, 2003

(51) Int. Cl.
G06F 15/16 (2006.01)
G06F 15/173 (2006.01)
G06F 15/177 (2006.01)

(52) U.S. Cl.
USPC ........... 709/249; 709/201; 709/203; 709/217; 709/218; 709/219; 709/220; 709/223; 709/250

(58) Field of Classification Search
USPC .................. 709/217–219, 223, 224, 203; 700/276–284; 370/242
See application file for complete search history.

(56) References Cited

U.S. PATENT DOCUMENTS

| | | | | |
|---|---|---|---|---|
| 5,251,153 A * | 10/1993 | Nielsen et al. | ................ | 700/284 |
| 5,479,339 A * | 12/1995 | Miller | .............................. | 700/16 |
| 5,740,031 A * | 4/1998 | Gagnon | .......................... | 700/16 |
| 5,740,038 A * | 4/1998 | Hergert | ......................... | 700/284 |
| 5,870,302 A * | 2/1999 | Oliver | ............................. | 700/11 |
| 5,926,463 A * | 7/1999 | Ahearn et al. | ................ | 370/254 |
| 6,102,061 A * | 8/2000 | Addink | ............................. | 137/1 |
| 6,108,590 A * | 8/2000 | Hergert | ......................... | 700/284 |
| 6,144,993 A * | 11/2000 | Fukunaga et al. | ............ | 709/224 |
| 6,192,282 B1 * | 2/2001 | Smith et al. | ..................... | 700/19 |
| 6,241,156 B1 * | 6/2001 | Kline et al. | .................. | 236/49.3 |
| 6,314,340 B1 * | 11/2001 | Mecham et al. | .............. | 700/284 |
| 6,437,692 B1 * | 8/2002 | Petite et al. | .................... | 340/540 |
| 6,526,581 B1 * | 2/2003 | Edson | ............................. | 725/74 |
| 6,647,015 B2 * | 11/2003 | Malkemes et al. | ............ | 370/401 |
| 6,735,619 B1 * | 5/2004 | Sawada | ......................... | 709/212 |
| 6,823,239 B2 * | 11/2004 | Sieminski | ..................... | 700/284 |
| 6,850,252 B1 * | 2/2005 | Hoffberg | ....................... | 715/716 |
| 6,850,819 B1 * | 2/2005 | Townsend | ..................... | 700/284 |
| 6,891,838 B1 * | 5/2005 | Petite et al. | .................... | 370/401 |
| 6,990,459 B2 * | 1/2006 | Schneider | ......................... | 705/8 |
| 7,046,161 B2 * | 5/2006 | Hayes | ........................ | 340/12.25 |
| 7,337,217 B2 * | 2/2008 | Wang | ............................. | 709/217 |
| 2001/0034754 A1 | 10/2001 | Elwahab et al. | .............. | 709/201 |
| 2002/0002425 A1 * | 1/2002 | Dossey et al. | ................. | 700/284 |
| 2002/0014539 A1 * | 2/2002 | Pagano et al. | ..................... | 239/1 |
| 2002/0021465 A1 * | 2/2002 | Moore et al. | ..................... | 359/125 |
| 2002/0078259 A1 * | 6/2002 | Wendorf et al. | .............. | 709/328 |
| 2002/0103688 A1 * | 8/2002 | Schneider | ......................... | 705/8 |

* cited by examiner

Primary Examiner — Thu Nguyen
Assistant Examiner — Angela Widhalm
(74) Attorney, Agent, or Firm — Toler Law Group, PC

(57) ABSTRACT

A residential gateway connects an Internet connection to an in-home network that has at least one residential device connected to the residential gateway. The residential gateway has software that receives control parameters from a control server via the Internet connection. The control server determines the control parameters from operational information of the residential device and relevant control information accessed from an information server on the Internet. The software causes the residential gateway to communicate with the residential device to provide control of the residential device based on the received control parameters. In a particular implementation, the residential device is a home irrigation system connected to the residential gateway via a wireless interface and the information server is a weather station server storing climatic information from a plurality of weather stations.

13 Claims, 2 Drawing Sheets

US 8,706,913 B2

RESIDENTIAL GATEWAY SYSTEM FOR AUTOMATED CONTROL OF RESIDENTIAL DEVICES

BACKGROUND OF THE INVENTION

1. Field of Invention

The present invention relates generally to the field of residential networks. More specifically, the present invention is related to automated control of residential devices using a residential gateway.

2. Discussion of Relevant Art

Generally, a residential gateway is a device that connects an in-home network (Intranet) to a, typically broadband, Internet connection (e.g., digital subscriber line (DSL), cable, satellite, etc.), which enables data communication among networked devices in the home and across the Internet. Accordingly, residential gateways typically combine the functions of a router and hub to provide for device connectivity and Internet access. Some residential gateways have an integrated broadband modem to connect to the broadband connection, while others rely on external modems. In more advanced residential gateways, the layer 2 switch (hub) even provides bridging across multiple networking technologies, such as Ethernet, Home Phone Line Networking Alliance (HPNA), IEEE 802.11b (Wi-Fi) wireless, Bluetooth wireless, USB point-to-point networking, etc. Thus, a residential gateway allows a number of different devices to be networked together (with advanced models bridging between network technologies) and share access to the Internet across a broadband connection.

U.S. Patent Publication 2001/0034754 describes a customer premises gateway that is connected between the Internet and an in-home network. The in-home network consists of a number of different "smart" devices in the user's home that are coupled to the gateway via different networking technologies. The customer premises gateway also provides a Markup-Language interface, e.g. XML or HTML, that allows the user to remotely provide commands to the devices connected to the in-home network, which, in effect, provides remote control of their behavior. For instance, a user can access the Internet from a location remote to their home, point a Web browser to the customer premises gateway, and send commands to turn their lights on and off, turn a sprinkler system on and off, control their CD player, etc. The customer premises gateway, therefore, provides a passive interface to the in-home network, allowing a user to manually issue commands to the devices on the in-home network from a remote location. The customer premises gateway, however, does not provide automatic control of a discrete device on the in-home network based on relevant data accessed from the Internet.

SUMMARY OF THE INVENTION

One aspect of the present invention provides a residential gateway connecting an Internet connection to an in-home network that comprises at least one residential device connected to the residential gateway. The residential gateway comprises a software module that receives control parameters from a control server via the Internet connection and causes the residential gateway to communicate with the residential device to provide control of the residential device based on the received control parameters. The control server determines the control parameters from relevant control information accessed from an information server on the Internet and operational information of the residential device.

Another aspect of the present invention provides a system for providing automated control of at least one residential device connected to an in-home network. The system comprises a residential gateway that connects the in-home network to an Internet connection and a control server that determines control parameters for controlling the residential device. The control parameters are determined from relevant control information accessed from an information server on the Internet and operational information of the residential device. The residential gateway comprises a software module that receives the control parameters from the control server via the Internet connection and causes the residential gateway to communicate with the residential device to provide control of the residential device based on the received control parameters.

Another aspect of the present invention provides a method of providing automated control of at least one residential device connected to a residential gateway. Relevant control information is retrieved from one or more information servers on the Internet and operational information of the residential device is tracked. Control parameters of the residential device are determined based on the tracked operational information and the retrieved control information. Te control parameters are communicated to the residential gateway via an Internet connection. The residential gateway then communicates with the residential device to provide control of the residential device based on the control parameters.

In a particular embodiment, the residential device is a home irrigation system and the information server is a weather station server available via the Internet.

DESCRIPTION OF THE PREFERRED EMBODIMENTS

Figure 1:
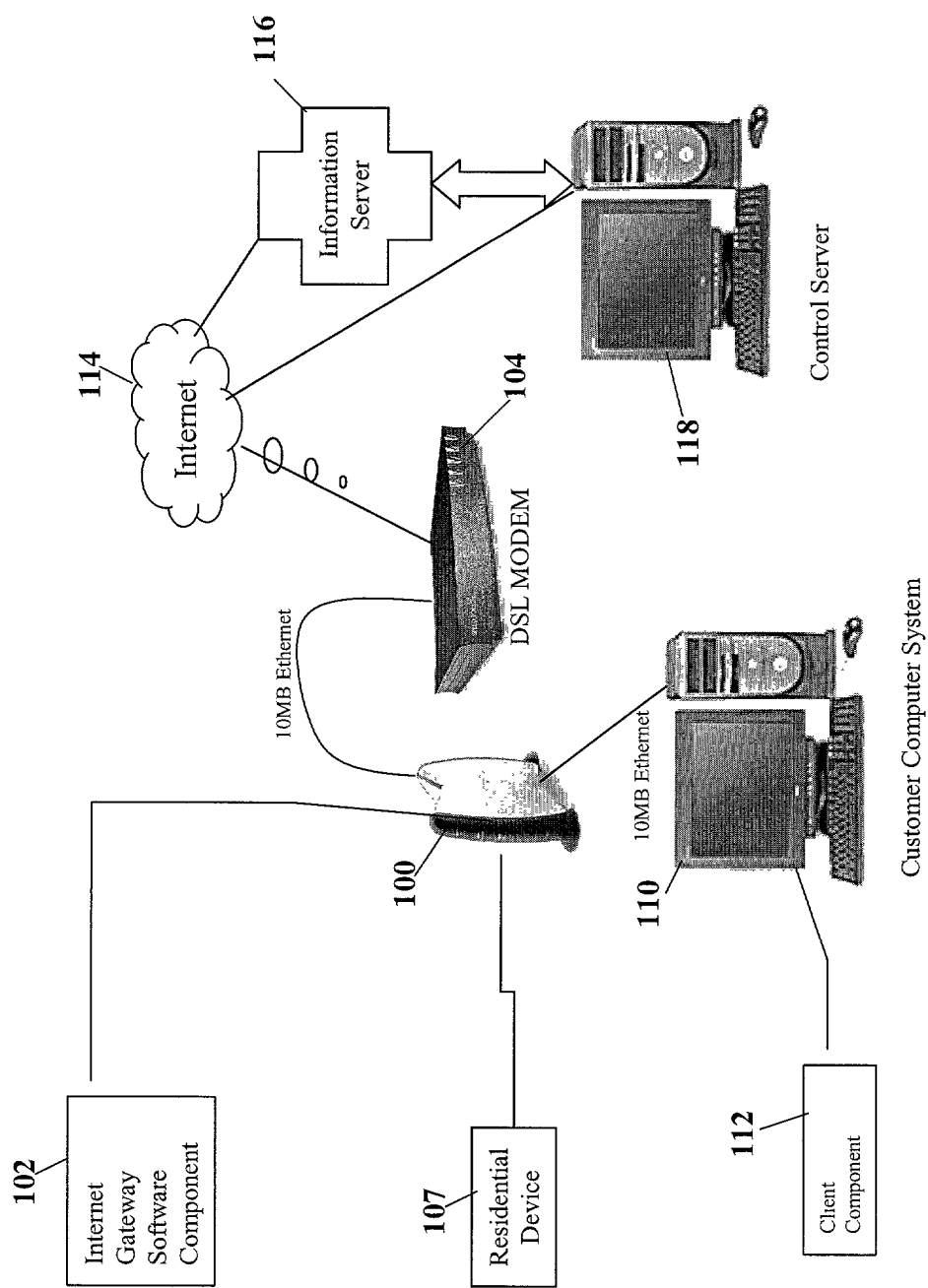
FIG. 1 illustrates a system according to the present invention in which a residential gateway provides for control of a residential device based upon control parameters received from a control server.

While this invention is illustrated and described in a preferred embodiment, the device may be produced in many different configurations, forms and materials. There is depicted in the drawings, and will herein be described in detail, embodiment(s) of the invention, with the understanding that the present disclosure is to be considered as an exemplification of the principles of the invention and the associated functional specifications for its construction and is not intended to limit the invention to the embodiment(s) illustrated. Those skilled in the art will envision many other possible variations within the scope of the present invention.

As illustrated in FIG. 1, a system according to the present invention comprises a residential gateway 100 that connects an in-home network to a broadband Internet connection. At least one residential device 107 that runs software supporting network communication capabilities is connected to the residential gateway 100. Residential device 107 also has a application programming interface (API) that responds to queries about its current state and that controls residential device 107 in response to received control commands.

Residential gateway 100 runs gateway software 102 that controls routing and switching functions for providing network connectivity among devices of the in-home network connected to gateway 100, including any bridging between network technologies supported by gateway 100, along with access to the Internet. Internet connectivity is provided via a, preferably broadband, connection (e.g., a DSL, cable, or satellite connection) that is accessed using an external broadband modem 104 connected to residential gateway 100. While an external modem is shown, it will be appreciated that a residential gateway incorporating an internal modem for Internet access is within the spirit of the present invention.

In addition to controlling routing and switching functions, gateway software 102 communicates with residential device 107 to provide control of residential device 107 based on control parameters received from control server 118, which is accessed via the Internet 114. Residential gateway 100 maintains a command set that is issued to residential device 107 to provide control of residential device 107.

Control server 118 tracks information about the residential device's operation and determines the control parameters from this operational information and relevant control information accessed from sources, such as an information server 116, accessible via the Internet. To perform tracking, residential gateway 100 periodically queries residential device 107 about its current state, which responds with operational information concerning its state. Residential gateway 100 forwards this operational information to control server 118. Software running on control server 118 processes the operational information and control information to determine the control parameters that are used by residential gateway 100 to control residential device 107.

A customer computer system 110 is also connected to the in-home network side of residential gateway 100 to provide the user with override and control capabilities and to display current and tracked operational information. Computer system 110 runs client software that communicates with residential gateway 100, which in turn communicates with residential device 107, to provide the user the capability of overriding the control parameters and to retrieve and display the current sate of residential device 107. In addition, client software 110 also communicates with control server 118 to retrieve and display tracked operational information, and to allow a user to configure an economic setpoint of operation of residential device 107. For instance, the user may want to limit the amount of electricity used by residential device 107 during a particular time period so as to keep electric costs low. In this case, residential device 107 will be controlled during the time period so as to not exceed the specified electric usage. Preferably, a mark-up language interface (e.g., HTML or XML) is used for override and to access and display operational information, in addition to configuring an economic setpoint.

Figure 2:
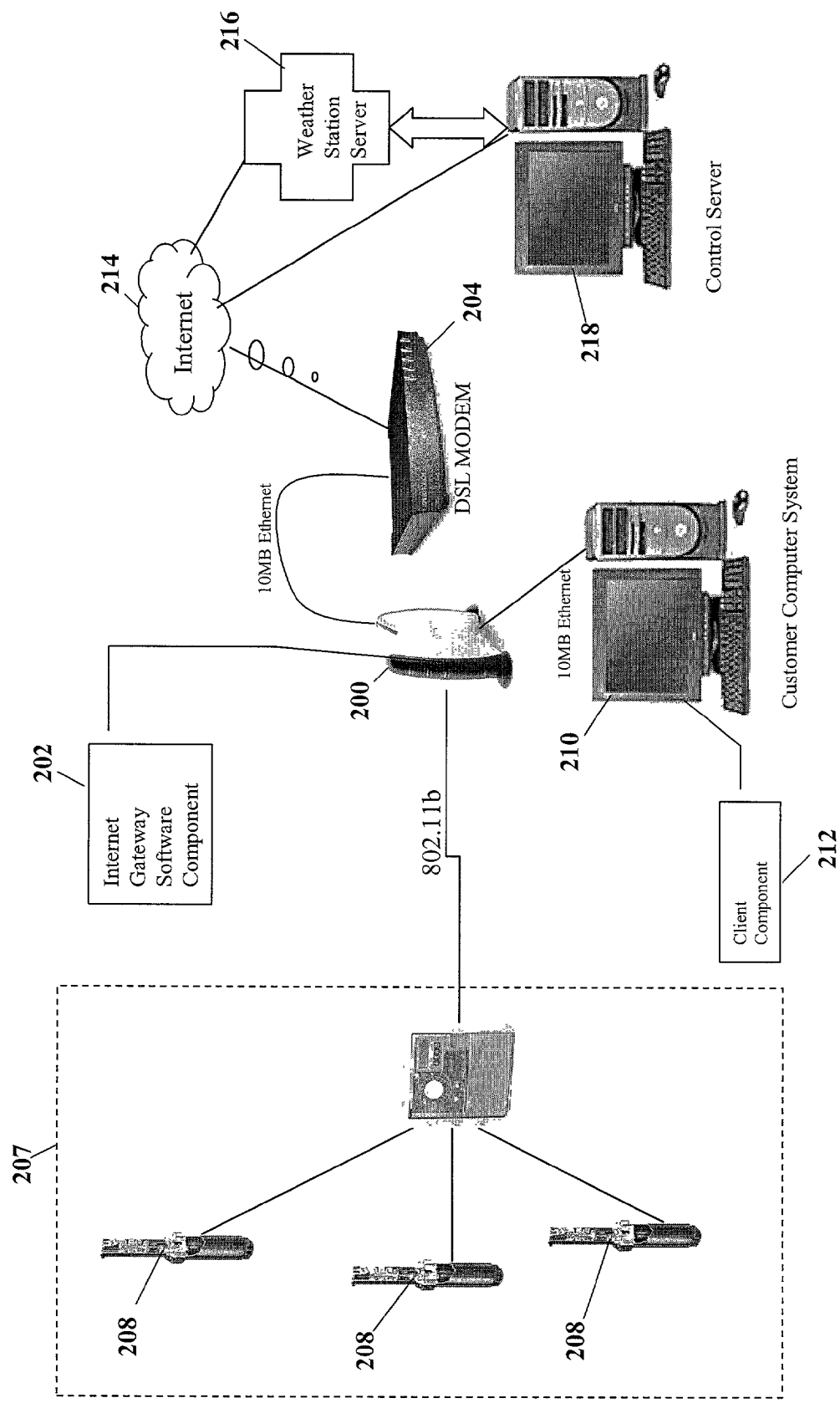
FIG. 2 illustrates a preferred embodiment of the present invention in which the residential device is a home irrigation system.

FIG. 2 shows a preferred embodiment of the present invention in which the residential device to be controlled is a home irrigation system 207. The home irrigation system comprises sprinklers 208 that are controlled by an irrigation controller 206. Sprinklers 208 have electrically controlled valves which controller 206 opens and closes according to a watering cycle to provide irrigation of the homeowner's lawn.

Irrigation controller 206 is connected to a residential gateway 200, preferably through a wireless networking technology such as IEEE 802.11b. As previously described, gateway software 202 running on gateway 200 communicates with home irrigation system 207 to provide control of system 207 based on control parameters received from control server 218, which is accessed via the Internet 214. The watering cycle (i.e., start time and length of time for watering) constitutes the control parameters for home irrigation system 206. The control parameters are determined by sophisticated irrigation control software running on control server 218.

Control server may track information from the irrigation system such as water usage and determine the watering cycle for the homeowner's irrigation system using this information, in conjunction with information about the climatic conditions in the homeowner's area (e.g., actual moisture in the air (humidity) and actual rain fall). A number of methods of determining optimal watering cycles from such climatic information and water usage are well known. Generally, the length of the water cycle can be determined from a value known as evapotranspiration. The length of an irrigation watering cycle should be such that an equal amount of moisture is returned to the vegetation as is lost through either evaporation from the soil or transpiration from the vegetation. The amount of water lost, and consequently the amount needed by the vegetation to maintain growth, is known as an evapotranspiration value. The evapotranspiration value for an area is normally calculated using climatic information such as temperature, humidity, etc. Climatic information is generally collected for a number of areas by weather stations located nationwide. Some networks of weather stations are connected to the Internet and, as a result, their collected climatic information can be accessed via the Internet. Typically, the information collected from the weather station network is stored on a weather station server 216 that is connected to the Internet 214.

For example, one such weather station network whose information is available via the Internet is owned by AWS, Inc. Many of the weather stations in the AWS network are connected to a direct Internet connection with their information immediately available, while others are connected via a standard phone line/modem setup and polled periodically. In either case, a weather station server owned by AWS makes the climatic information collected by these weather stations available via the Internet. Information on the AWS system can be found at the Internet website http://ww3.weatherbug.com.

In addition, as previously described, via the client component 212 and customer computer system 210, a user can configure an economic setpoint for the control of irrigation system 207. For instance, the user may want to keep the water usage and electricity usage of irrigation system 207 below a certain point during each month so as to keep water and electricity costs low. As a result, control server 218 uses the additional operational information of electricity usage, in addition to water usage, to determine the optimal watering cycle at this given economic point configured by the user. This allows a user to be able to make economic decisions that may give less than optimal performance for his/her lawn, but may yield a lawn acceptable at a given economic point Thus, control server 218 retrieves the homeowner's local weather conditions from a weather station server 216 that is available via Internet 214. In addition, control server 218 tracks operational information of irrigation system 207. From this climatic information and tracked operational information, in addition to any economic setpoint configured by the user, the irrigation control software running on control server 218 calculates the control parameters (i.e., water cycle) of home irrigation system 207. The control parameters are then communicated to residential gateway 200.

As previously described, the control parameters are communicated to residential gateway 200 via an Internet connection using an external modem 204 that is connected to gateway 200 through, for example, a 10 Mb/s Ethernet interface. As will be appreciated by one of skill in the art, a different network interface can be used to connect external modem 204 to gateway 200, or modem 204 can be integrated with gateway 200, without departing from the scope or spirit of the present invention.

Based upon the communicated control parameters, residential gateway communicates with irrigation controller 206 to provide for control of the irrigation system 207. As described, residential gateway 200 has a command set that it issues to irrigation system 207 to control irrigation system 207. The residential gateway 200 issues commands to residential device 200 based on the control parameters and the API of irrigation system 207 causes irrigation system 207 to operate according to the commands received from residential gateway 200.

A system and method has been shown in the above embodiments for the effective implementation of a residential gateway system for automated control of residential devices. While various embodiments have been shown and described, it will be understood that there is no intent to limit the invention by such disclosure, but rather, it is intended to cover all modifications and alternate constructions falling within the spirit and scope of the invention, as defined in the appended claims.

The invention claimed is:

1. A method comprising:
    storing a command set at a residential gateway, the command set usable to control a home irrigation system;
    receiving state information of the home irrigation system at the residential gateway from the home irrigation system;
    sending the state information to a control server;
    receiving tracked operational information of the home irrigation system at the residential gateway from the control server;
    sending, from the residential gateway, the state information and the tracked operational information to a computer, wherein the home irrigation system includes an irrigation controller connected to the residential gateway and a sprinkler connected to the irrigation controller to water a lawn, wherein the sprinkler includes an electrically controlled valve functioning according to a watering cycle;
    receiving, at the residential gateway, an economic setpoint of operation associated with the home irrigation system from the computer, the economic setpoint of operation including a cost of operating the home irrigation system;
    sending the economic setpoint of operation from the residential gateway to the control server;
    receiving, at the residential gateway, control parameters from the control server, wherein the control parameters are based on the economic setpoint of operation, the state information, the tracked operational information, or any combination thereof;
    selecting, at the residential gateway, one or more commands of the stored command set to issue to the home irrigation system based on an application program interface of the home irrigation system and based on the control parameters;
    sending the selected commands from the residential gateway to the home irrigation system via the application program interface;
    receiving, at the residential gateway, an instruction from the computer to override the state information and the tracked operational information; and
    sending a command from the residential gateway to the home irrigation system based on the instruction.

2. The method of claim 1, wherein the economic setpoint of operation is set to control an amount of electricity used by the home irrigation system, an amount of water used by the home irrigation system, or any combination thereof during a particular time period.

3. The method of claim 1, wherein the irrigation controller is connected to the residential gateway via a wireless interface.

4. The method claim 1, wherein the residential gateway communicates with the control server via the Internet.

5. The method of claim 1, further comprising sending a request for the state information from the residential gateway to the home irrigation system, wherein the state information is received in response to the request.

6. The method of claim 5, wherein the request for the state information is sent using the application program interface of the home irrigation system.

7. A system comprising:
    a processor; and
    a memory, wherein the memory stores instructions that, when executed by the processor, cause the processor to perform operations comprising:
        storing, a command set at a residential gateway, the command set usable to control a home irrigation system;
        receiving state information of the home irrigation system from the home irrigation system;
        sending the state information to a control server;
        receiving an economic setpoint of operation associated with the home irrigation system from a computer, the economic setpoint of operation including a cost of operating the home irrigation system;
        sending the economic setpoint of operation to the control server;
        receiving control parameters from the control server, wherein the control parameters are based on the economic setpoint of operation, the state information, or any combination thereof;
        selecting, at a residential gateway, one or more commands of the stored command set to issue to the home irrigation system based on an application program interface of the home irrigation system and based on the control parameters; and
        sending the selected commands to the home irrigation system via the application program interface.

8. The system of claim 7, wherein the economic setpoint of operation is set to control an amount of electricity used by the home irrigation system, an amount of water used by the home irrigation system, or any combination thereof during a particular time period.

9. The system of claim 7, wherein the irrigation controller is connected to the residential gateway via a wireless interface.

10. The system of claim 7, wherein the residential gateway communicates with the control server via the Internet.

11. The system of claim 7, wherein the operations further comprise sending a request for the state information from the residential gateway to the home irrigation system, wherein the state information is received in response to the request.

12. The system of claim 11, wherein the request for the state information is sent using the application program interface of the home irrigation system.

13. A computer readable storage device storing instructions that, when executed by a processor, cause the processor to perform operations comprising:
    storing, at a residential gateway, a command set, the command set usable to control a home irrigation system;
    receiving state information of the home irrigation system from the home irrigation system;
    sending the state information to a control server;
    receiving an economic setpoint of operation associated with the home irrigation system from a computer, the economic setpoint of operation including a cost of operating the home irrigation system;

sending the economic setpoint of operation to the control server;

receiving control parameters from the control server, wherein the control parameters are based on the economic setpoint of operation, the state information, or any combination thereof;

selecting, at a residential gateway, one or more commands of the stored command set to issue to the home irrigation system based on an application program interface of the home irrigation system and based on the control parameters; and sending the selected commands to the home irrigation system via the application program interface.

\* \* \* \* \*